(12) United States Patent
Xu et al.

(10) Patent No.: US 12,088,460 B1
(45) Date of Patent: Sep. 10, 2024

(54) SYSTEMS AND METHODS FOR SEAMLESS EDGE SERVICE TRANSFER

(71) Applicant: Verizon Patent and Licensing Inc., Basking Ridge, NJ (US)

(72) Inventors: Kevin Xu, Warren, NJ (US); Patricia R. Chang, San Ramon, CA (US); Mason Ng, Hillsborough, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/470,525

(22) Filed: Sep. 20, 2023

(51) Int. Cl.
*H04L 41/0806* (2022.01)
*H04L 47/83* (2022.01)

(52) U.S. Cl.
CPC ......... *H04L 41/0806* (2013.01); *H04L 47/83* (2022.05)

(58) Field of Classification Search
CPC ............................ H04L 41/0806; H04L 47/83
USPC ........................................................ 709/222
See application file for complete search history.

(56) References Cited

U.S. PATENT DOCUMENTS

| | | | | |
|---|---|---|---|---|
| 2019/0138934 A1* | 5/2019 | Prakash | ............... | G06F 18/2148 |
| 2021/0027415 A1* | 1/2021 | Khalid | .................. | G06N 20/00 |
| 2021/0360500 A1* | 11/2021 | Mehta | ................. | H04W 36/385 |
| 2022/0141282 A1* | 5/2022 | Liu | .......................... | H04L 67/60 |
| | | | | 709/223 |
| 2022/0368767 A1* | 11/2022 | Subramaniam | ......... | H04L 67/52 |
| 2023/0370416 A1* | 11/2023 | Sabella | ............... | H04L 61/4511 |
| 2024/0039804 A1* | 2/2024 | Aygar | ...................... | H04L 63/04 |
| 2024/0056358 A1* | 2/2024 | Saxena | ............... | H04L 41/0897 |

FOREIGN PATENT DOCUMENTS

| | | | | |
|---|---|---|---|---|
| WO | WO-2020013677 A1 * | 1/2020 | .......... | H04L 61/1511 |
| WO | WO-2020207266 A1 * | 10/2020 | ........... | H04L 41/082 |
| WO | WO-2022241233 A1 * | 11/2022 | ............. | H04L 67/10 |

* cited by examiner

*Primary Examiner* — Ruolei Zong

(57) ABSTRACT

A system described herein may determine that a first measure of likelihood of demand for a particular service from a first set of edge computing devices exceeds a first threshold, and may instruct the first set of edge computing devices to provision resources to provide the particular service. The system may subsequently determine that a second measure of likelihood of demand for the particular service from a second set of edge computing devices exceeds a second threshold, the second set of edge computing devices being a subset of the first set of edge computing devices, and may initiate a service state synchronization operation with respect to the second set of edge computing devices. The system may select a particular edge computing device, of the second set of edge computing devices, to provide the particular service to a User Equipment ("UE").

20 Claims, 13 Drawing Sheets

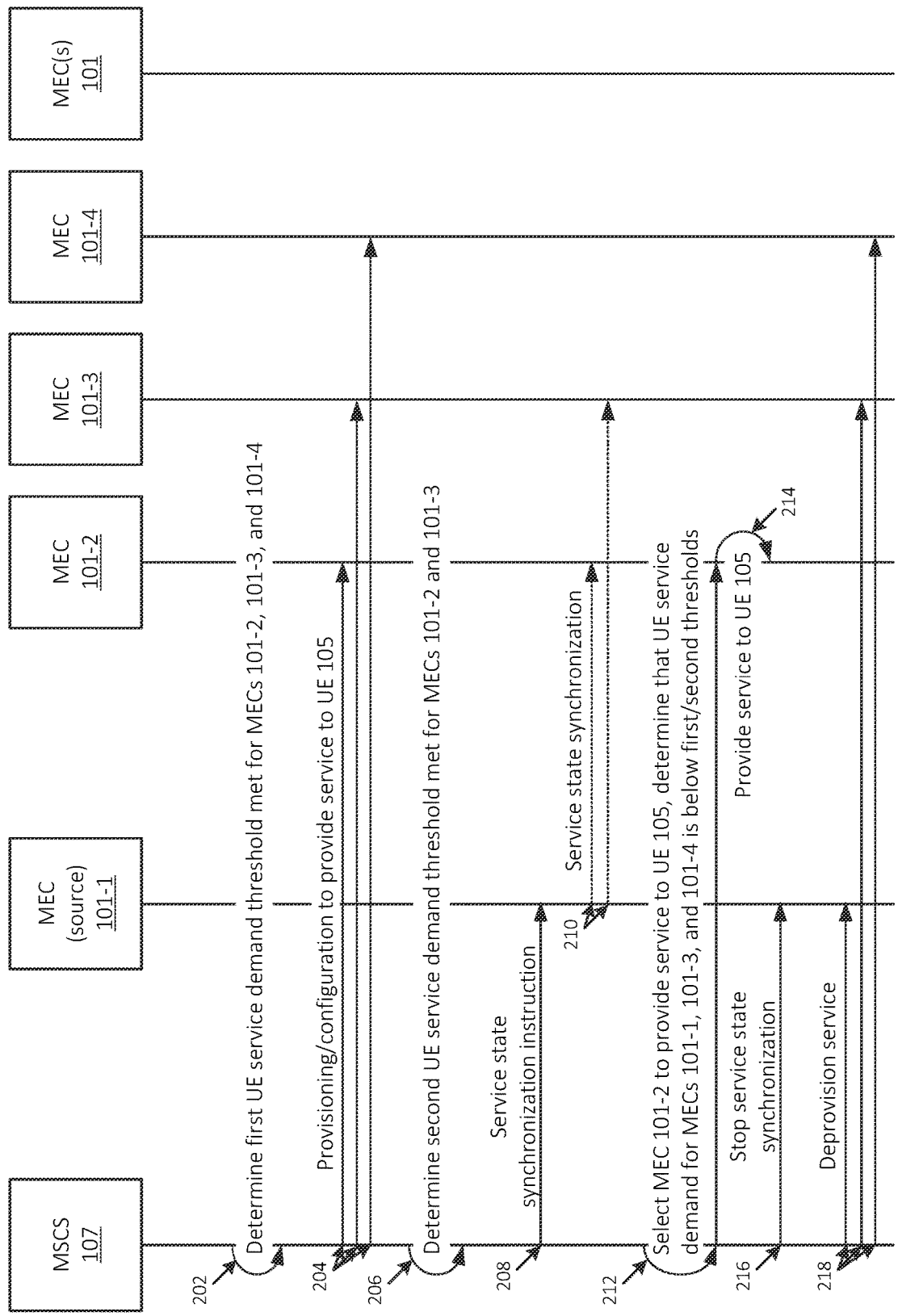

SYSTEMS AND METHODS FOR SEAMLESS EDGE SERVICE TRANSFER

BACKGROUND

Wireless networks may utilize edge computing devices that are deployed in geographically diverse locations in order to provide services, such as low-latency services, to User Equipment ("UEs") such as mobile telephones, Internet of Things ("IoT") devices, tablets, etc. that are located in different regions. When traveling through different regions, UEs may receive the same service from different edge computing devices that each provide service to a different respective region.

BRIEF DESCRIPTION OF THE DRAWINGS

FIG. 2 illustrates an example multi-stage edge computing service transfer, in accordance with some embodiments;

DETAILED DESCRIPTION OF EXAMPLE EMBODIMENTS

The following detailed description refers to the accompanying drawings. The same reference numbers in different drawings may identify the same or similar elements.

Figure 1A:
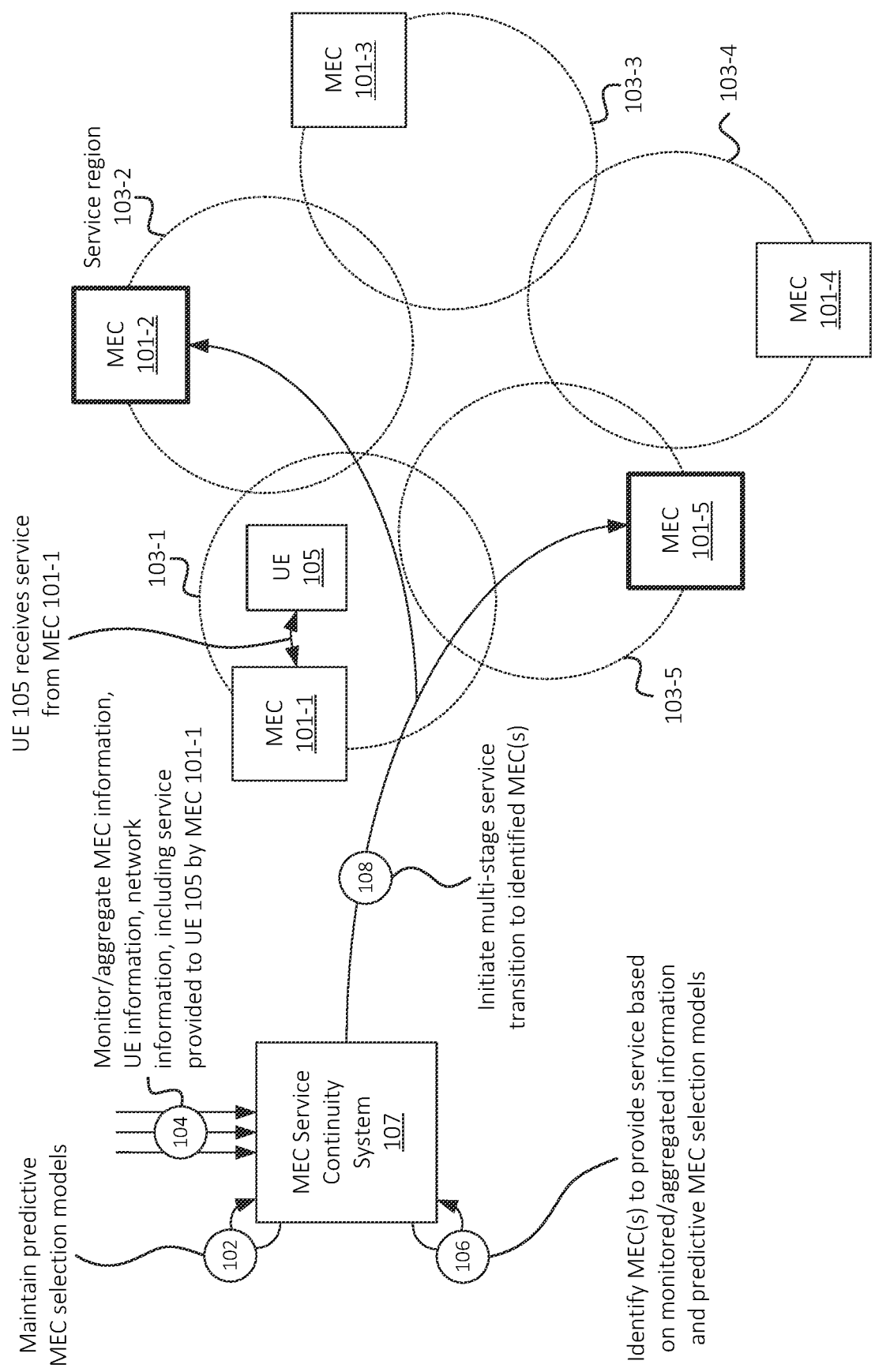
FIGS. 1A-1C illustrate an example overview of one or more embodiments described herein.

As shown in FIG. 1, a network may include and/or may be communicatively coupled to a set of edge computing devices, such as Multi-Access/Mobile Edge Computing ("MEC") devices, referred to sometimes herein simply as a "MECs" 101. Edge computing devices, such as MECs 101, may be deployed at hardware resources that are located at geographically distinct locations, such as respective service regions 103. For example, MEC 101-1 may be deployed within, and/or may otherwise provide services to UEs located within, service region 103-1; MEC 101-2 may be deployed within, and/or may otherwise provide services to UEs located within, service region 103-2; MEC 101-3 may be deployed within, and/or may otherwise provide services to UEs located within, service region 103-3; and so on.

Each service region 103 may represent a particular geographical location or region, such as a city, a town, a city block, a building, or some other suitable type of geographical region. MECs 101 may each be co-located with (e.g., located at or geographically proximate to) base stations or other wireless network infrastructure via which UEs receive wireless network connectivity. Each MEC 101 may include or implement services, applications, or other containerized functions. Such services may include latency-sensitive services such as augmented reality ("AR") services, autonomous or semi-autonomous vehicle control services, automated factory robot control services, or other types of services. When a UE receives services from a given MEC 101, traffic associated with such services may not need to traverse, be routed through, etc. a core of the network, a "far cloud," or other resources that are geographically further from the UE than MEC 101.

For example, as shown, UE 105 may receive one or more services from MEC 101-1 based on being located within service region 103-1, with which MEC 101-1 is associated. As discussed above, receiving the one or more services may include communicating with MEC 101-1 to receive the service in lieu of communicating with an application server via a core network and/or some other network. MEC 101-1 may include, implement, execute, etc. an application (e.g., a "server-side" application) associated with the service, and UE 105 may include, implement, execute, etc. an application (e.g., a "client-side" application) associated with the service.

In accordance with some embodiments, MEC Service Continuity System ("MSCS") 107 may facilitate the seamless transfer or handover of the service from one MEC 101 to another, such as in situations where UE 105 moves from one MEC 101 to another, where a particular MEC 101 becomes overloaded, etc. MSCS 107 may, in some embodiments, be implemented by a particular MEC 101 out of the groups of MECs 101. In some embodiments, MSCS 107 may be implemented by some other suitable device or system, such as a MEC application control and/or orchestration platform associated with MECs 101.

MSCS 107 may, for example, determine or predict the demand for a given service at a particular service region 103 (and/or from a particular MEC 101) in such situations. In order to do so, MSCS 107 may receive, maintain, refine (e.g., using artificial intelligence/machine learning ("AI/ML") techniques or other suitable techniques), etc. (at 102) a set of predictive MEC selection models. The MEC selection models may include factors such as MEC performance or load information, UE location or movement information, network performance metrics (e.g., load, capacity, throughput, radio signal quality, etc. of a radio access network ("RAN") to which MECs 101 are communicatively coupled), and/or other suitable factors based on which MSCS 107 may identify situations in which a particular service received by a UE (e.g., UE 105 in the examples provided herein) from a given MEC 101 should potentially be provided by another MEC 101.

Such situations may be identified based on receiving, monitoring, aggregating, maintaining, etc. (at 104) MEC information, UE information, network information, real-time performance metrics, etc., as discussed above. MSCS 107 may, for example, be communicatively coupled to some or all of MECs 101 in order to receive real time or near-real time monitoring information, such as load and/or capacity information (e.g., processor load, memory load, etc.) of each MEC 101, hardware capabilities or attributes (e.g., quantity or types of processors, amount of storage space, types of storage devices, etc.) of each MEC 101, geographical location of each MEC 101 (e.g., a location of hardware resources used to implement each MEC 101, and/or an indication of which respective service region 103 is served by each MEC 101), or other suitable MEC information. In some embodiments, the MEC information may include an indication of services being provided by a given MEC 101 to one or more UEs 105, an indication of applications installed or available to be installed at MEC 101, or the like. In some embodiments, MSCS 107 may receive MEC information from each MEC 101 via an application programming interface ("API") or other suitable pathway. Additionally, or alternatively, MSCS 107 may receive such information from an orchestration system, containerization platform management system, or other suitable device or system that monitors or otherwise determines such information associated with some or all MECs 101.

UE information for a given UE 105 may include location information of UE 105 (e.g., current location, historical location information indicating locations at which UE 105 has been located in the past, etc.), one or more user models (e.g., models or classifications indicating a type or category of a user of UE 105, such as "first responder," "gamer," "enterprise user." etc.), one or more UE models (e.g., models or classifications indicating a type or category of UE 105, such as mobile phone, Internet of Things ("IT") device, tablet device, wearable device, semi-autonomous robot, etc.), and/or other information associated with UE 105. UE information may be received from one or more UEs 105 (e.g., via an API or other suitable communication pathway between UEs 105 and MSCS 107), from a RAN to which UEs 105 are connected, and/or some other suitable source. In some embodiments, UE information may include signal or channel quality measurements taken by UEs 105, such as Signal-to-Interference-and-Noise-Ratio ("SINR"), Received Signal Strength Indicator ("RSSI"), Channel Quality Indicator ("CQI"), etc. between UEs 105 and respective base stations or cells of a RAN (e.g., where such base stations or cells are associated with respective MECs 101 and/or service regions 103).

Network information may include load and/or capacity metrics associated with particular base stations, service regions 103, etc. For example, such information include a quantity of UEs 105 connected to a particular base station or located within a particular service region 103, an amount of radio frequency ("RF") resources that are used and/or are available at a particular base station or within a particular service region 103, Service Level Agreements ("SLAs") or other Quality of Service ("QoS") information associated with particular base stations or service regions 103, or the like. MSCS 107 may receive such information from a RAN that includes such base stations or from some other suitable source.

Based on the MEC selection models and the monitored or aggregated information (e.g., as received at 104), MSCS 107 may identify (at 106) a set of MECs 101 to potentially provide the service that is currently being provided to UE 105 by MEC 101-1. For example, MSCS 107 may determine that UE 105 is likely to move to service region 103-2 or to service region 103-5, and may accordingly determine that corresponding MECs 101-2 and 101-5 should be prepared to provide the service to UE 105, in the event that UE 105 does move to service region 103-2 or to service region 103-5. As discussed below, preparing MECs 101-2 and 101-5 to provide the service may include initiating (at 108) a multi-stage service transition with respect to the identified MECs 101-2 and 101-5. For example, in a first stage of the multi-stage service transition, MSCS 107 may instruct MECs 101-2 and 101-5 to provision resources associated with the service (e.g., provision, allocate, reserve, etc. storage resources, processor resources, or the like to accommodate a container, installation package, image, etc. associated with one or more applications via which the service is provided), and/or to obtain (e.g., from an application or image library or repository), install, instantiate, etc. the service at MECs 101-2 and 101-5 (e.g., install the one or more applications, images, installation packages, etc. associated with the service). In this manner, MECs 101-2 and MEC 101-5 may be prepared or "warmed up" to provide the service in the event that UE 105 moves into service region 103-2 or service region 103-5.

Different stages of the multi-stage service transition procedure may be based on different conditions, events, thresholds, etc. For example, the first stage may be initiated when UE 105 is predicted, with a first measure of likelihood (e.g., a first threshold likelihood), as being likely to move to service region 103-2 or to service region 103-5, and the second stage may be initiated when UE 105 is predicted, with a second measure of likelihood (e.g., a second threshold likelihood that is more likely than the first threshold), as being likely to move to service region 103-2 or to service region 103-5. Generally, for example, the first stage may be initiated earlier than the second stage. In the first stage, MECs 101-2 and 101-5 may be instructed to provision resources, instantiate applications associated with the service, etc., as such operations may take a relatively long amount of time. In the second stage, MEC 101-1 (e.g., which is currently providing the service to UE 105) may be instructed to synchronize a state of the service with MECs 101-2 and/or 101-5, which may be a relatively faster procedure than the provisioning procedure. In this manner, network resources associated with synchronizing the state of the service may not be consumed until it is determined that UE 105 is more likely to actually demand the service from a given MEC 101, while such MEC 101 may have been prepared ahead of time to provide the service, ultimately resulting in a smooth user experience (e.g., little to no service disruption when the providing of the service is transferred from one MEC 101 to another) as well as improved efficiency of the network.

Figure 1B:
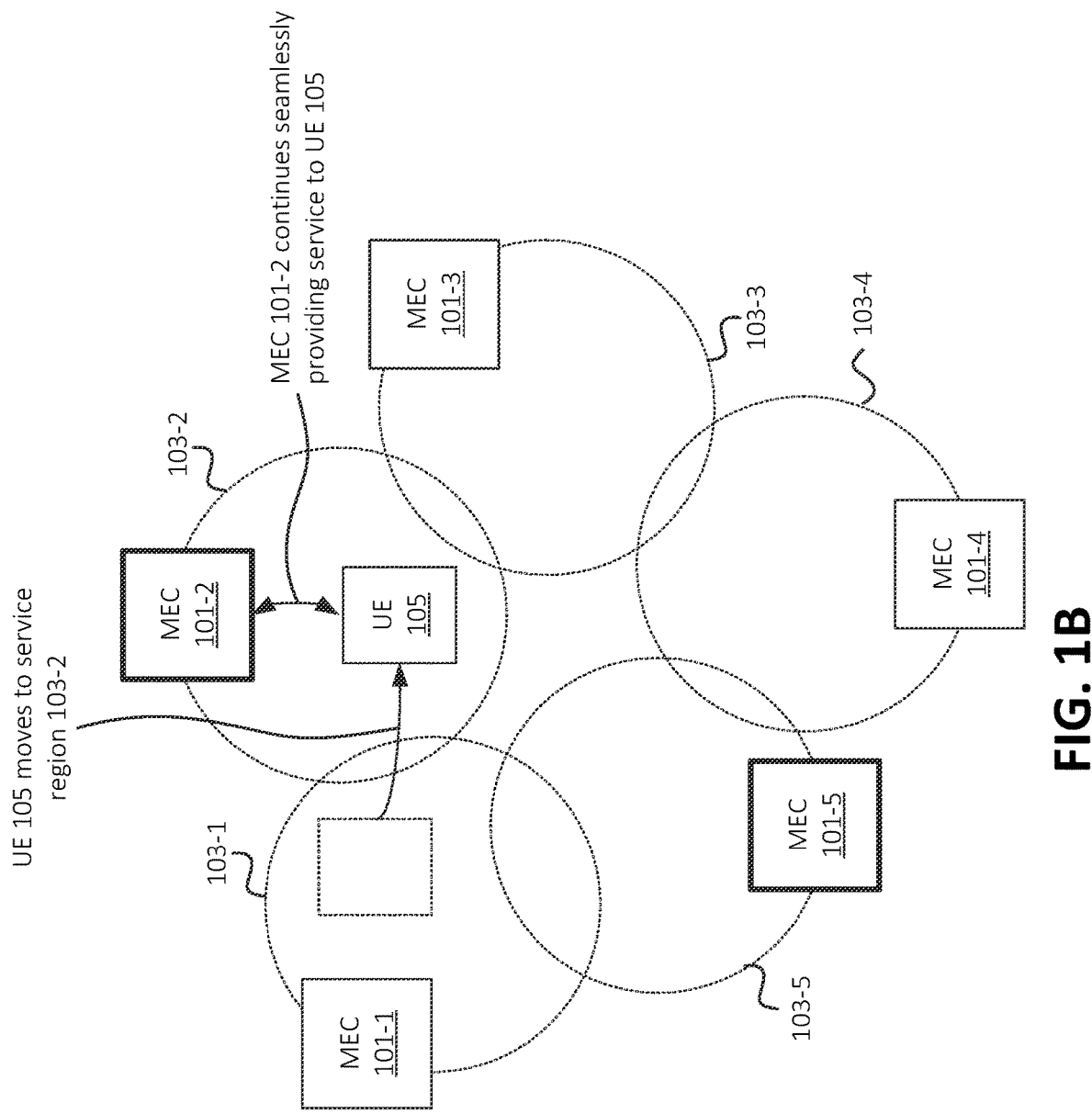

As shown in FIG. 1B, for example, UE 105 may ultimately move to service region 103-2, and may receive the service from MEC 101-2 based on such movement. Since MEC 101-2 has been prepared to provide the service to UE 105 through the multi-stage service transfer procedure, the transfer may be seamless from the standpoint of a user of UE 105. For example, the transfer may be imperceptible to the user, as MEC 101-2 is in possession of up-to-date service state information by way of the synchronization of state information with MEC 101-1, which was previously providing the service to UE 105.

Figure 1C:
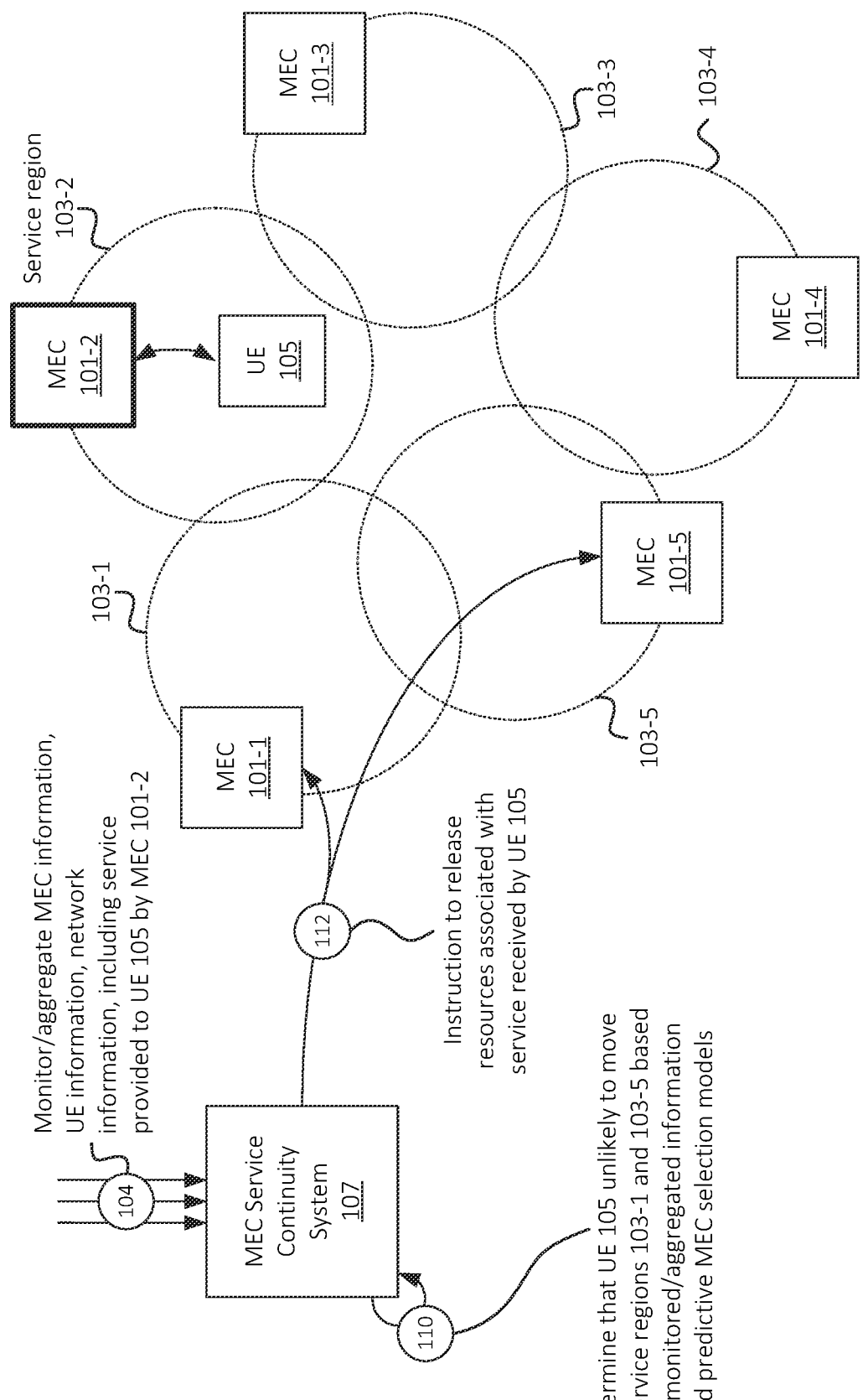

As shown in FIG. 1C, after UE 105 has moved to service region 103-2 and has begun receiving the service from MEC 101-2, MSCS 107 may determine (at 110) that UE 105 is unlikely to move to service regions 103-1 and/or 103-5. For example, such determination may be based on continued monitoring (at 104) of MEC information, UE information, etc. as well as comparing such monitored information to the MEC selection models discussed above. Since MSCS 107 has determined that UE 105 is unlikely (e.g., a measure of likelihood is below a threshold) to demand the service from MECs 101-1 and 101-5 (e.g., is unlikely to move to service regions 103-1 and/or service region 103-5), MSCS 107 may instruct (at 112) MECs 101-1 and 101-5 to release resources associated with the service received by UE 105. Such instructions may cause MECs 101-1 and 101-5 to uninstall, dismount, uninstantiate, remove, etc. one or more applications, images, containers, etc. associated with the service. Additionally, or alternatively, MECs 101-1 and 101-5 may deprovision or release hardware resources, which were used to implement such applications, containers, etc. Such hardware resources, once released, may be made available for use for other purposes, such as for other containers, virtual machines, etc. associated with MECs 101-2 and 101-5.

FIG. 2 illustrates an example of the multi-stage service transfer procedure of some embodiments. In this example, assume that UE 105 is currently receiving a service from MEC 101-1. In this sense, MEC 101-1 may be considered as a "source" MEC. As shown, MSCS 107 may determine (at 202) that a first UE service demand threshold is met for a set of MECs 101, namely MECs 101-2, 101-3, and 101-4, in this example. The first UE service demand threshold may be identified based on a measure of likelihood that UE 105 will demand the service from MECs 101-2, 101-3, and 101-4. Generally, for example, MSCS 107 may determine that there is some possibility that UE 105 will move to service region 103-2, service region 103-3, or to service region 103-4. This measure of likelihood may also be considered as a measure of confidence that UE 105 will move to service region 103-2, 103-3, or service region 103-4, and/or that UE 105 will otherwise demand the service from MEC 101-2, MEC 101-3, or MEC 101-4. Accordingly, MSCS 107 may instruct (at 204) MECs 101-2, 101-3, and 101-4 to provision resources for the service, to instantiate the service, start the service, and/or to otherwise perform configuration operations associated with providing the service. In some embodiments, MSCS 107 may communicate (at 204) with a respective management system, orchestration platform, etc. associated with MECs 101-2, 101-3, and/or 101-4 to perform suitable provisioning and/or configuration to provide the service to UE 105.

As discussed above, such operations may exclude a service state synchronization operation (e.g., communicating with MEC 101-1 to receive service state information). As shown, one or more other MECs 101 may not receive (at 204) the provisioning and/or configuration instruction, as such MECs 101 may not have been identified (at 202) as exceeding the first service demand threshold (e.g., UE 105 may be relatively unlikely to demand the service from such MECs 101).

At some subsequent time, MSCS 107 may determine (at 206) that a second UE service demand threshold is met for MECs 101-2 and 101-3. In this example, such determination may be made without determining that the second UE service demand threshold is met for MEC 101-4. As one example, UE 105 may have moved toward service regions 103-2 and 103-3, but may not have moved toward (or may have moved away from) service region 103-4. As noted above, the second UE service demand threshold may be associated with a relatively higher likelihood that UE 105 will demand the service from MEC 101-2 or MEC 101-3, while the first UE service demand may be associated with a relatively lower likelihood that UE 105 will demand the service from MEC 101-2 or MEC 101-3.

Based on determining that the second UE service demand threshold is met for MECs 101-2 and 101-3, MSCS 107 may instruct (at 208) MEC 101-1 to synchronize state information associated with the service with MECs 101-2 and 101-3, based on which MEC 101-1 may perform (at 210) a service state synchronization with MECs 101-2 and 101-3. The synchronization procedure may include, for example, providing state information, context information, variables or other values associated with the service, or the like to MECs 101-2 and 101-3 (e.g., to "server-side" applications installed or instantiated on MECs 101-2 and 101-3). MEC 101-1 may provide the state information to MECs 101-2 and 101-3 on an ongoing basis, in real time or near-real time. In this manner, MECs 101-1, 101-2, and 101-3 may all be up-to-date with respect to the state of the service being provided to UE 105. As indicated by the dashed lines in the figure, the service state synchronization operation (at 210) may include communications from MEC 101-1 and MECs 101-2 and 101-3, and/or may include communications between some other device or system (e.g., UE 105) and MECs 101-2 and 101-3, as discussed below.

Figure 3A:
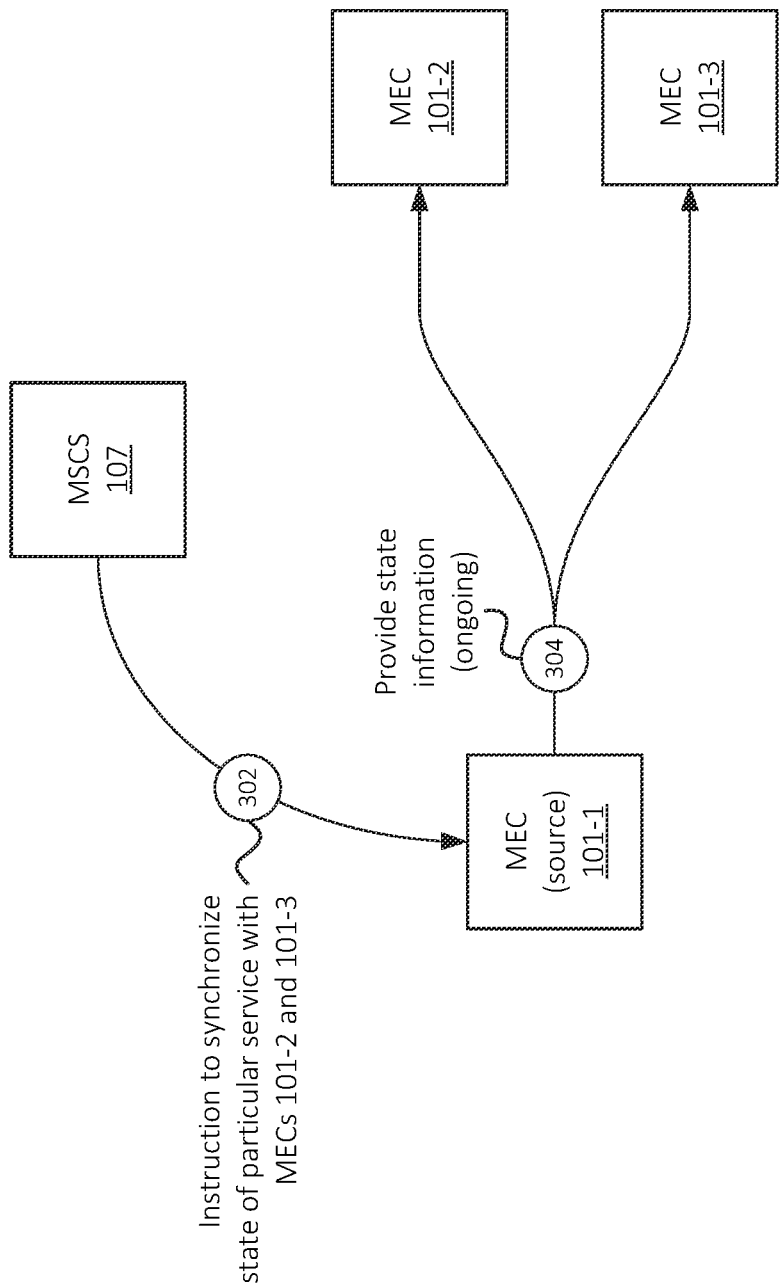
FIGS. 3A, 3B, and 4 illustrate examples of a service state synchronization operation, in accordance with some embodiments.
Figure 3B:
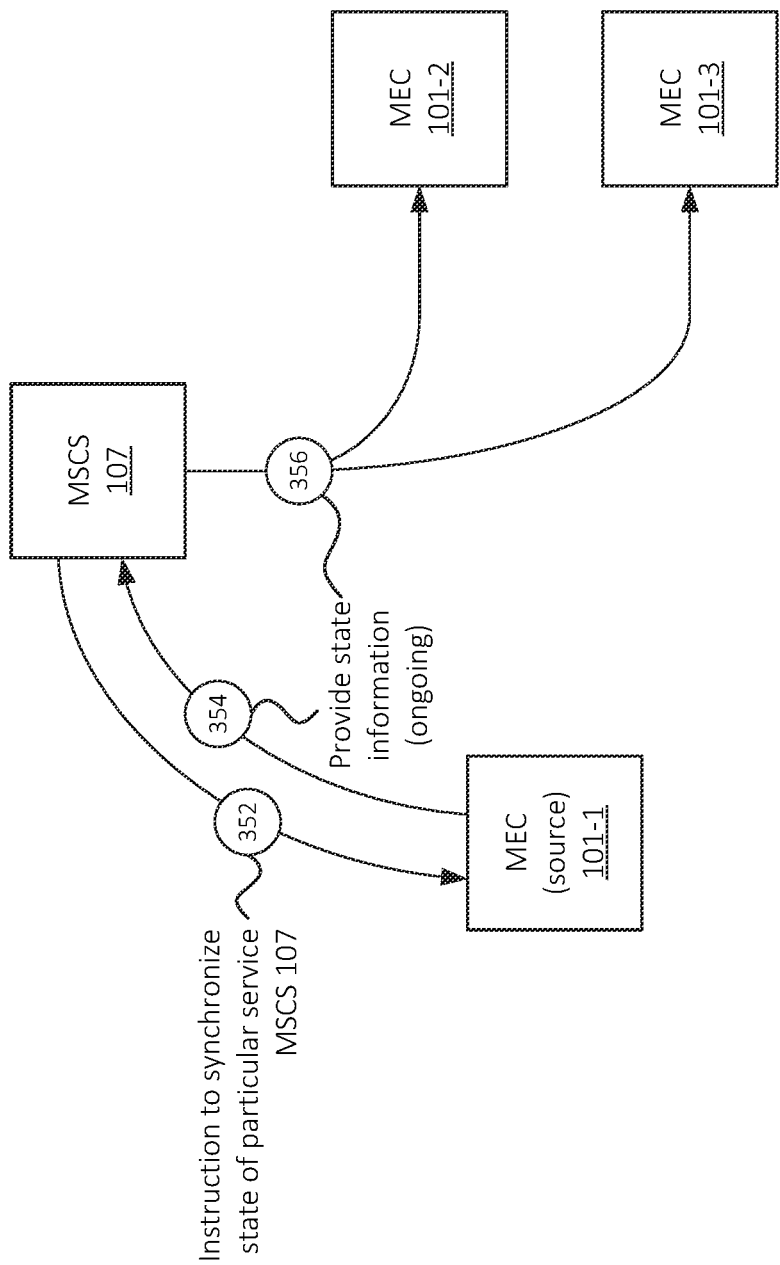
Figure 4:
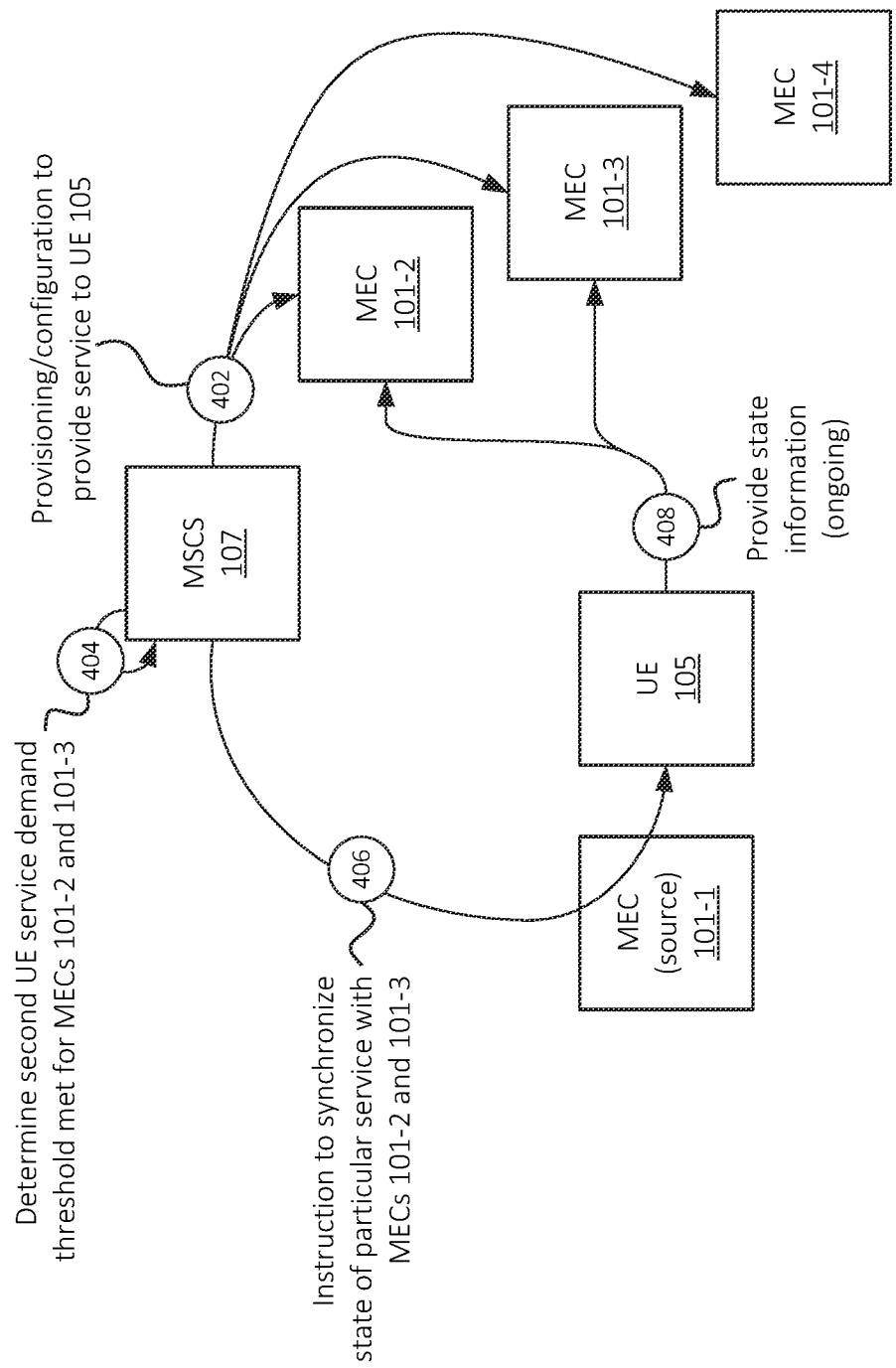

For example, FIGS. 3A, 3B, and 4 illustrate examples of the state synchronization procedure (at 208 and 210). In FIGS. 3A and 3B, MEC 101-1 may provide state information to MECs 101-2 and 101-3 (e.g., based on a determination that a UE service demand threshold is met for MECs 101-2 and 101-3, as discussed above). In FIG. 4, UE 105 may communicate with MECs 101-2 and 101-3 to provide the service state information to MECs 101-2 and 101-3 (e.g., MEC 101-1 may not need to communicate with MECs 101-2 and 101-3 to synchronize the service state).

As shown in FIG. 3A, for example, MSCS 107 may instruct (at 302) MEC 101-1 to synchronize service state information with MECs 101-2 and 101-3. MSCS 107 may provide, for example, identifiers, Internet Protocol ("IP") addresses, or other suitable communication information associated with MECs 101-2 and 101-3, to MEC 101-1. MEC 101-1 may communicate (at 304) with MECs 101-2 and 101-3 using such information, in order to provide the service state information on ongoing basis. As another example, as shown in FIG. 3B, MSCS 107 may instruct (at 352) MEC 101-1 to provide service state information to MSCS 107 (e.g., without providing an indication of MECs 101-2 and/or 101-3 to MEC 101-1). MEC 101-1 may provide (at 354) the service state information to MSCS 107, and MSCS 107 may route, forward, provide, etc. (at 356) the service state information to MECs 101-2 and 101-3.

As shown in FIG. 4, MSCS 107 may instruct (at 402) MECs 101-2, 101-3, and 101-4 to provision and/or perform one or more configuration operations in order to provide the service to UE 105. For example, as discussed above, MSCS 107 may have determined (at 202) that a first UE service demand threshold is met with respect to MECs 101-2, 101-3, and 101-4. MSCS 107 may receive or otherwise determine communication information associated with MECs 101-2, 101-3, and/or 101-4 (e.g., IP addresses or other suitable communication information).

As similarly discussed above, MSCS 107 may, at some point, determine (at 404) that a second UE service demand is met with respect to MECs 101-2 and 101-3 (e.g., not MEC 101-4). MSCS 107 may output (at 406) an instruction to synchronize the state of the service with MECs 101-2 and 101-3. As similarly noted above, the instruction may include IP addresses or other suitable communication information of the indicated MECs 101-2 and 101-3. In some embodiments, the instruction (at 406) may include an identifier of the service, an identifier of UE 105, and/or other suitable information based on which MEC 101-1 may identify that the state of the service provided to UE 105 should be synchronized with MECs 101-2 and 101-3. In some embodiments, the service itself (e.g., one or more applications executed by MEC 101-1 via which the service is provided to UE 105) may include or implement an API or other suitable mechanism by which MEC 101-1 may provide, via the service, the state synchronization instruction (including communication information for MECs 101-2 and 101-3) to UE 105. For example, as discussed above, MEC 101-1 may implement a "server side" application via which MEC 101-1 provides the service, and UE 105 may implement a "client side" application via which UE 105 receives the service. In some embodiments, the server side application, implemented by MEC 101-1, may provide the synchronization instruction to the client side application implemented by UE 105. In some embodiments, MEC 101-1 may communicate the service state synchronization instruction to UE 105 in some other suitable manner.

Based on receiving (at 406) the state synchronization instruction, UE 105 may provide (at 408) the service state information to MECs 101-2 and 101-3 on an ongoing basis. In this manner, as discussed above, MECs 101-2 and 101-3 may be kept up-to-date with respect to the service and may be able to provide the service to UE 105 in a seamless manner in the event that a demand for the service is determined for MEC 101-2 or MEC 101-3. Further, since MEC 101-1 does not communicate the service state information to MECs 101-2 and 101-3 in accordance with some embodiments, network resources and/or processing resources associated with MEC 101-1 may be conserved for the state synchronization operation.

Returning to FIG. 2, MSCS 107 may select (at 212) MEC 101-2 to provide the service to UE 105. For example, MSCS 107 may identify that one or more conditions, criteria, thresholds, etc. with respect to one or more MEC selection models are met. As another example, MSCS 107 may identify that a third UE service demand threshold is met with respect to MEC 101-2 (e.g., a higher threshold, indicating a greater likelihood of demand for the service from MEC 101-2 and/or reflecting that UE 105 should otherwise receive the service from MEC 101-2 instead of from MEC 101-1) has been met.

MSCS 107 may accordingly notify MEC 101-2, UE 105, and/or some other suitable device or system that MEC 101-2 has been selected to provide the service to UE 105 (e.g., that the service has been transferred from MEC 101-1 to MEC 101-2). Since MEC 101-2 has been provisioned and configured (at 204) with the service, and is further up-to-date on service state information (based on the synchronization operation at 210), UE 105 may be able to continue receiving (at 214) the service in a seamless manner.

MSCS 107 may further determine (at 212) that a UE service demand for MECs 101-1, 101-3, and 101-4 is below the first UE service demand threshold and/or the second UE service demand threshold. For example, as discussed above, MSCS 107 may determine that UE 105 is relatively unlikely to demand the service from MECs 101-1, 101-3, or 101-4. As such, MSCS 107 may instruct MECs 101-1, 101-3, and 101-4 to deprovision the service and/or to cease other operations related to the service, including operations related to preparing to provide the service. For example, MSCS 107 may instruct (at 216) MECs 101-1, 101-3, and 101-4 to cease communications related to service state synchronization. Additionally, or alternatively, MSCS 107 may instruct (at 218) MECs 101-1, 101-3, and 101-4, to uninstall an application associated with the service, release resources used for the service, etc.

In some example situations, MSCS 107 may identify (e.g., after the service has been transferred to MEC 101-2) that the first UE service demand threshold remains exceeded for one or more MECs (e.g., MEC 101-1), but that the second UE service demand threshold is no longer exceeded for such MECs. In such situations, MSCS 107 may instruct MEC 101-1 to retain the applications, resources, etc. associated with the service (e.g., may forgo instruction MEC 101-1 to remove the applications, release the resources, etc.).

As another example, MSCS 107 may identify (e.g., after the service has been transferred to MEC 101-2) that the first and second UE service demand thresholds remain exceeded for one or more MECs (e.g., MEC 101-1). For example, although MEC 101-2 has been selected to provide the service to UE 105, it may be relatively likely that UE 105 will demand the service from MEC 101-1. In such situations, MSCS 107 may instruct MEC 101-2 to synchronize service state information with MEC 101-1, such that MEC 101-1 remains prepared for the service to be transferred to MEC 101-1.

Figure 5:
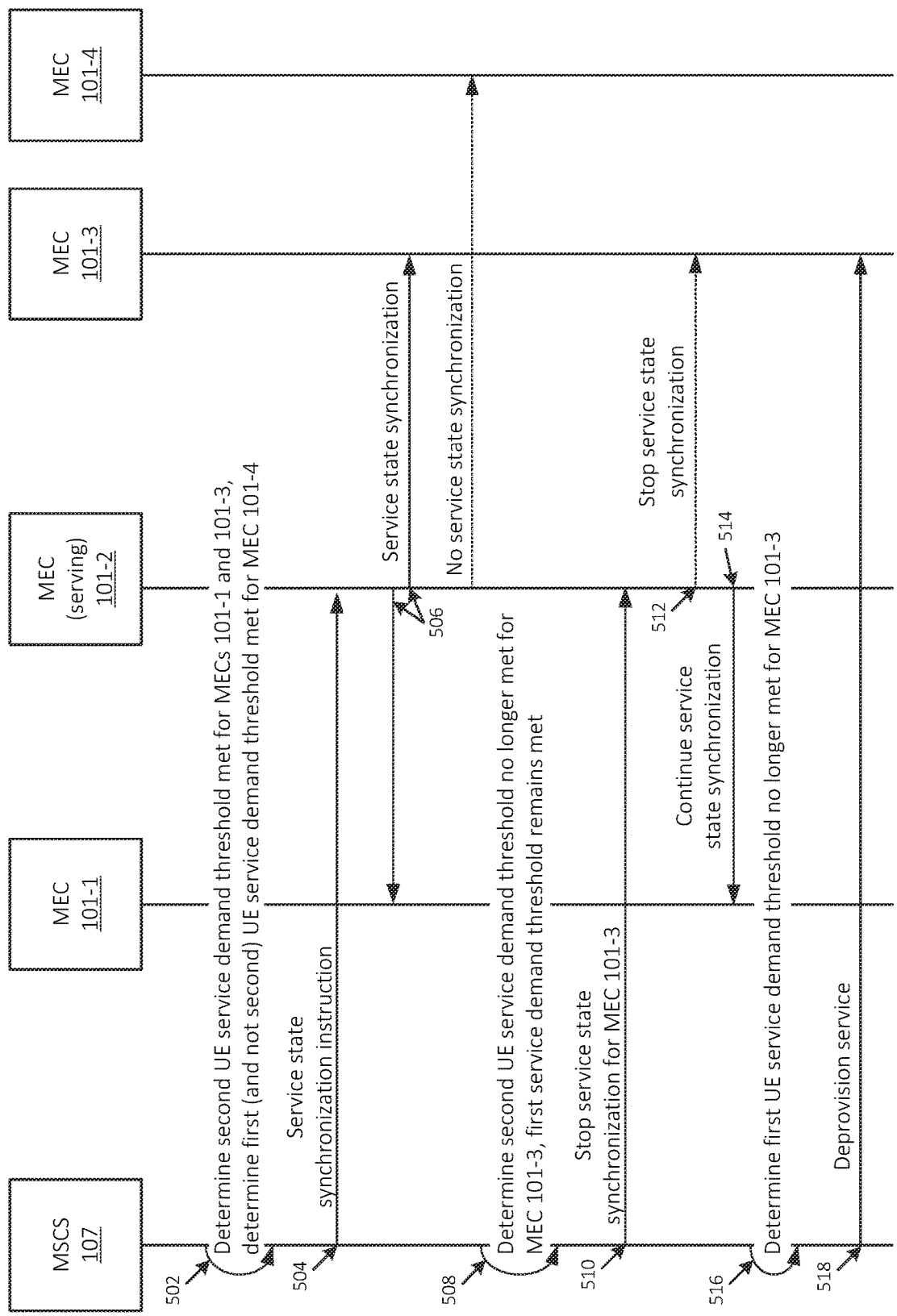
FIG. 5 illustrates an example multi-stage edge computing service deprovisioning procedure, in accordance with some embodiments.

FIG. 5 illustrates another example of a multi-stage service transfer procedure, in which service state synchronization operations may be stopped and/or services may be deprovisioned in multiple stages. In some embodiments, the first and second UE service demand thresholds referred to above with respect to FIG. 2 may be the same as the first and second UE service demand thresholds, respectively, referred to in FIG. 5. In some embodiments, the thresholds referred to in FIG. 2 may be different from the thresholds referred to in FIG. 5.

In FIG. 5, assume that MEC 101-2 is currently providing a service to UE 105 (e.g., MEC 101-2 is a "serving" MEC with respect to UE 105). For example, MEC 101-2 may have been selected to provide the service based on a selection of MEC 101-2 in accordance with the procedure shown in FIG. 2, in which the service was transferred from MEC 101-1 to MEC 101-2. As such, further assume that the service remains provisioned, instantiated, installed, etc. at MECs 101-1, 101-3, and 101-4 (e.g., MECs 101-1, 101-3, and 101-4 may have provisioned resources for the service, installed one or more applications associated with the service, etc.).

MSCS 107 may determine (at 502), while MEC 101-2 is providing the service to UE 105, that the second UE service demand threshold is met for MECs 101-1 and 101-3, but is not met for MEC 101-4. MSCS 107 may however determine that the first UE service demand for MEC 101-4. For example, UE 105 may be relatively highly likely to demand the service from MEC 101-1 or from MEC 101-3, and may be relatively less likely (but still more likely than a particular threshold) to demand the service from MEC 101-4.

As such, since MECs 101-1 and 101-3 exceed the second UE demand threshold, and assuming MECs 101-1 and 101-3 have already been provisioned, configured, etc. to provide the service, MSCS 107 may initiate (at 504 and 506) a service state synchronization, in which the service state is synchronized between MECs 101-2 (the serving MEC), 101-1, and 101-3. Since MEC 101-4 does not exceed the second UE demand threshold, the service state may not be synchronized with MEC 101-4. As discussed above, the service state synchronization operation (at 506) may include communications from MEC 101-2 to MECs 101-1 and 101-3, and/or may include communications from UE 105 to MECs 101-1 and 101-3.

At some point, MSCS 107 may determine (at 508) that the second UE service demand threshold is no longer met for MEC 101-3, but that MEC 101-3 continues to exceed the first UE service demand threshold. As such, MSCS 107 may initiate a stopping of the service state synchronization for MEC 101-3. For example, MSCS 107 may instruct (at 510) MEC 101-2 and/or MEC 101-3 to cease communicating to synchronize the service state. Based on the instruction, MEC 101-2 may stop communicating (at 512) with MEC 101-3 to synchronize the service state with MEC 101-3, while MEC 101-2 may continue communicating (at 514) with MEC 101-1 to synchronize the service state with MEC 101-1 (i.e., since the instruction did not indicate that the synchronization should be stopped for MEC 101-1).

MSCS 107 may subsequently determine (at 516) that the first UE service demand threshold is no longer met for MEC 101-3. For example, MSCS 107 may determine that it is now relatively unlikely that UE 105 will demand the service from MEC 101-3. As such, MSCS 107 may instruct (at 518) MEC 101-3 to deprovision the service, including uninstalling or uninstalling applications or containers associated with the service, releasing resources used or reserved for the service, etc. As similarly noted above, since the deprovisioning (at 518) is directed to MEC 101-3, MEC 101-2 and MEC 101-1 may continue communicating to synchronize the service state (e.g., for as long as MEC 101-1 exceeds the second UE service demand threshold). In this manner, the different stages of the service transfer procedure may be applied in a granular fashion, thus further enhancing the efficiency of the a network with which MECs 101 are associated.

Figure 6:
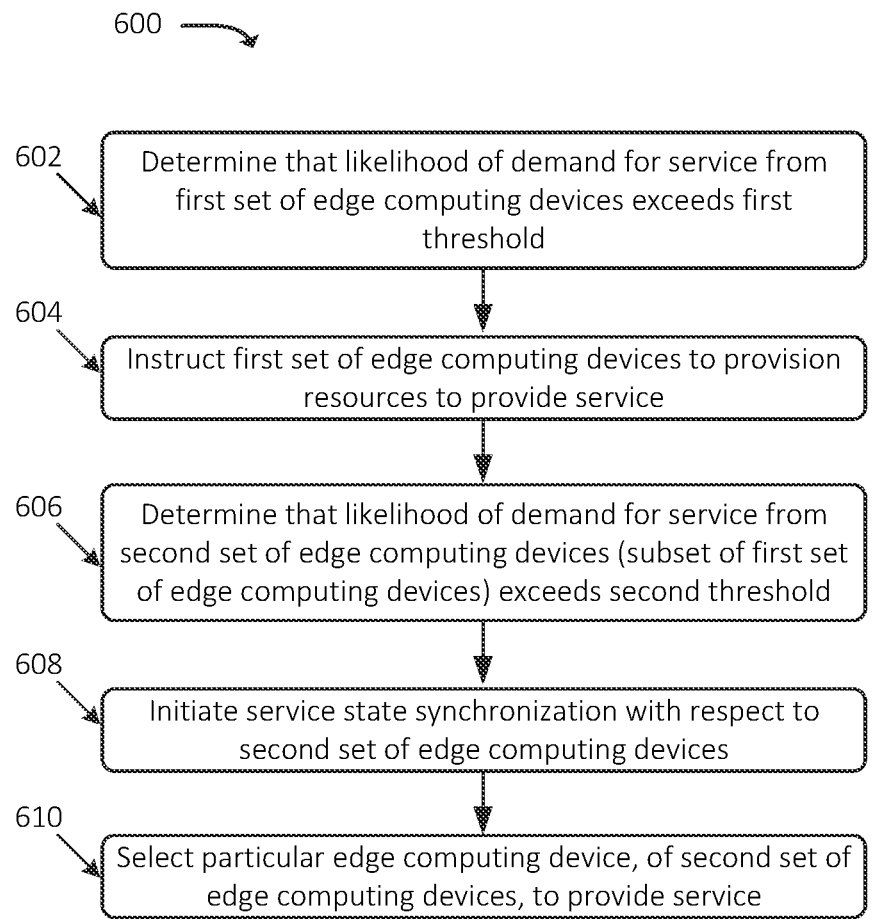
FIG. 6 illustrates an example process for performing a multi-stage edge computing service transfer, in accordance with some embodiments.

FIG. 6 illustrates an example process 600 for performing a multi-stage edge computing service transfer, in accordance with some embodiments. In some embodiments, some or all of process 600 may be performed by MSCS 107. In some embodiments, one or more other devices may perform some or all of process 600 in concert with, and/or in lieu of, MSCS 107.

As shown, process 600 may include determining (at 602) that a likelihood of demand for service from a first set of edge computing devices exceeds a first threshold. For example, as discussed above, MSCS 107 may identify that a particular UE, such as UE 105, that is receiving the service from a particular edge computing device (e.g., a particular MEC, such as MEC 101-1) is likely to demand the service from one or more other edge computing devices (e.g., the first set of edge computing devices), such as a set of MECs 101. For example, as discussed above, based on historical information associated with UE 105, network information, MEC information, MEC selection models, etc., MSCS 107 may identify that the likelihood that the particular UE 105 will demand the service from such MECs 101 (e.g., which may include a likelihood that the particular UE 105 will enter respective service regions 103 associated with such MECs 101) exceeds a first threshold.

While examples above are presented in the context of a particular UE 105 demanding, or being likely to demand, service from one or more MECs 101, similar concepts may apply on the scale of multiple (e.g., dozens, hundreds, etc.) of UEs 105. For example, MSCS 107 may identify a measure of likelihood of demand for a given service based on evaluating historical information or other information associated with multiple UEs 105, and may identify that such measure of demand, for the multiple UEs 105, exceeds the first threshold. As one example, if a particular set of MECs 101 are located in, or otherwise serve, a particular service region 103 that includes a sports stadium, MSCS 107 may identify that the particular MECs 101 are associated with at least the threshold measure of likelihood of demand at a time that corresponds to (e.g., is before) a scheduled sporting event at the sports stadium.

Process 600 may further include instructing (at 604) the first set of edge computing devices to provision resources to provide the service. For example, as discussed above, MSCS 107 may instruct the first set of edge computing devices (e.g., the first set of MECs 101), or may instruct some other device or system such as an orchestration system associated with the first set of edge computing devices, to provision resources, instantiate or install containers or applications, etc. in order to prepare to provide the particular service, in the event that it is ultimately determined (e.g., at a future time, such as 30 seconds later, 10 minutes later, etc.) that one or more of such edge computing devices should actually provide the service.

Process 600 may additionally include determining (at 606) a likelihood of demand for service from a second set of edge computing devices (e.g., a subset of the first set of edge computing devices) exceeds a second threshold. For example, MSCS 107 may determine, at some point after the first set of edge computing devices have been instructed (at 604) to provision resources, install applications, etc., that the likelihood of demand for service from some or all of the edge computing devices of the first set of edge computing devices exceeds a second threshold (e.g., a higher threshold and/or a threshold that indicates a greater likelihood of demand, or otherwise indicates a more urgent demand). For example, as discussed above, MSCS 107 may identify that one or more UEs 105 (e.g., UEs 105 that are currently receiving the service or are otherwise likely to demand the service) are moving toward respective service regions 103 associated with such edge computing devices, and/or that a time of demand is approaching.

As another example, continuing with the scenario described above in which the first set of edge computing devices are located in or serve a particular service region 103 that includes a sports stadium, MSCS 107 may identify that a time of the scheduled event is approaching. The time of the scheduled event approaching may indicate an increased likelihood of demand for the service from some or all of the first set of edge computing devices (e.g., where the second set of edge computing devices includes some or all of the edge computing devices of the first set of edge computing devices).

Process 600 may also include initiating (at 608) a service state synchronization operation with respect to the second set of edge computing devices. For example, MSCS 107 may cause the second set of edge computing devices to communicate with each other and/or one or more other edge computing devices (e.g., a particular edge computing device that is currently providing the service to one or more UEs 105), in order to maintain synchronized and/or otherwise up-to-date state information associated with the service.

Process 600 may further include selecting (at 610) selecting a particular edge computing device, of the second set of edge computing devices, to provide the service. For example, MSCS 107 may identify that one or more edge computing devices of the second set of edge computing devices should provide the service, which may include communicating with one or more UEs 105 that demand or otherwise receive the service. Since the second set of edge computing devices have been prepared ahead of time (e.g., including the provisioning and/or configuring operation(s) as well as the service state synchronization operation), the one or more UEs 105 may receive the service with minimal or zero perceptible disruption or lag time.

Figure 7:
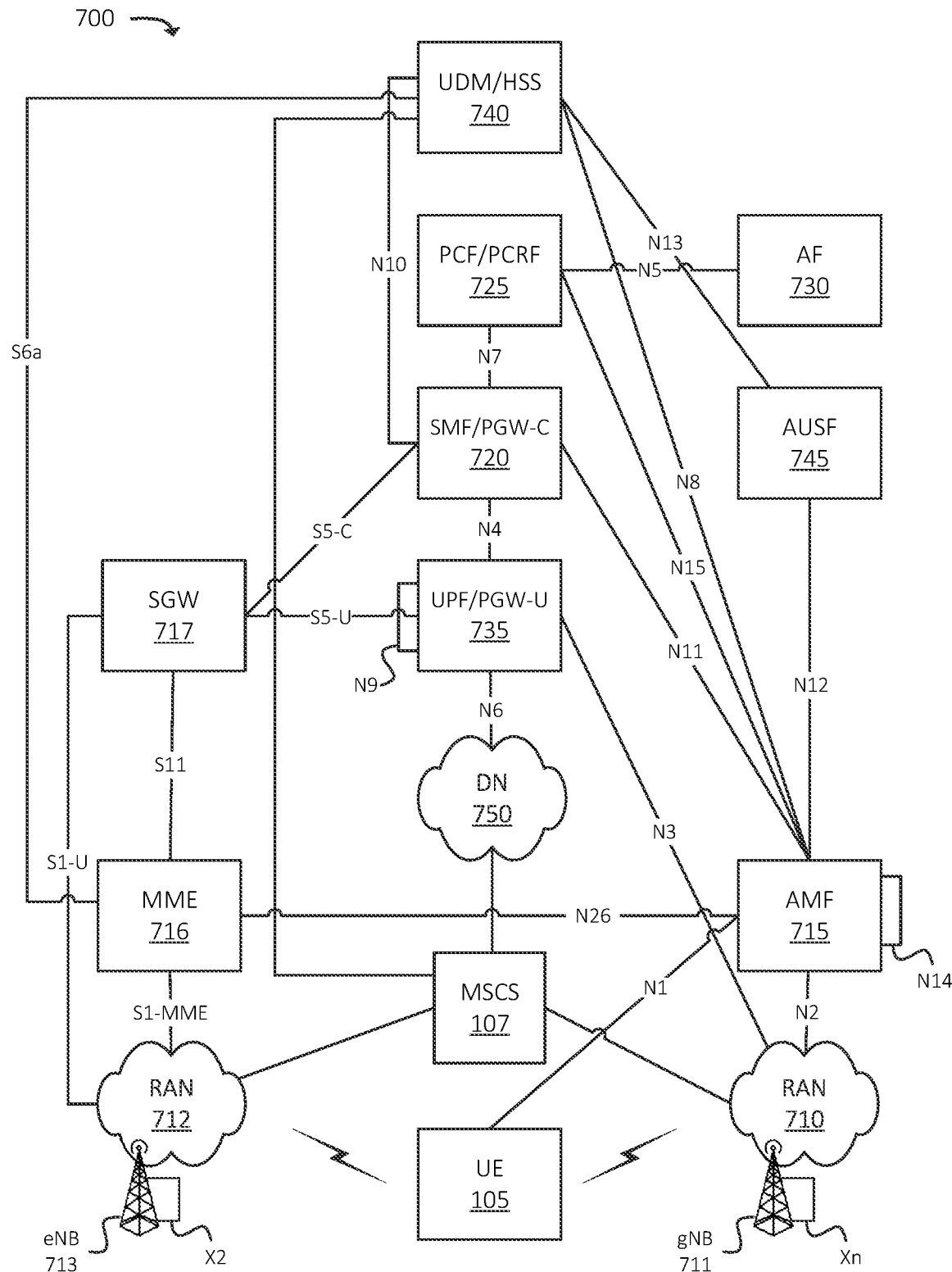
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 105, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as MSCS 107. While MSCS 107 is described as being implemented with respect to a network associated with environment 700 (e.g., a 5G network, an LTE network, an NSA network, a wireless network, etc.), MSCS 107 may be implemented with respect to one or more other types of networks (e.g., a wired network, another type of wireless network not specifically mentioned above, etc.).

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs.

UE 105 may include a computation and communication device, such as a wireless mobile communication device that is capable of communicating with RAN 710, RAN 712, and/or DN 750. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 105 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 105 may communicate with one or more other elements of environment 700. UE 105 may communicate with RAN 710 via an air interface (e.g., as provided by gNB 711). For instance, RAN 710 may receive traffic (e.g., user plane traffic such as voice call traffic, data traffic, messaging traffic, etc.) from UE 105 via the air interface, and may communicate the traffic to UPF/PGW-U 735 and/or one or more other devices or networks. Further, RAN 710 may receive signaling traffic, control plane traffic, etc. from UE 105 via the air interface, and may communicate such signaling traffic, control plane traffic, etc. to AMF 715 and/or one or more other devices or networks. Additionally, RAN 710 may receive traffic intended for UE 105 (e.g., from UPF/PGW-U 735, AMF 715, and/or one or more other devices or networks) and may communicate the traffic to UE 105 via the air interface.

RAN 712 may be, or may include, a LTE RAN that includes one or more base stations (e.g., one or more eNBs 713), via which UE 105 may communicate with one or more other elements of environment 700. UE 105 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 105 via the air interface, and may communicate the traffic to UPF/PGW-U 735 (e.g., via SGW 717) and/or one or more other devices or networks. Further, RAN 712 may receive signaling traffic, control plane traffic, etc. from UE 105 via the air interface, and may communicate such signaling traffic, control plane traffic, etc. to MME 716 and/or one or more other devices or networks. Additionally, RAN 712 may receive traffic intended for UE 105 (e.g., from UPF/PGW-U 735, MME 716, SGW 717, and/or one or more other devices or networks) and may communicate the traffic to UE 105 via the air interface.

AMF 715 may include one or more devices, systems, Virtualized Network Functions ("VNFs"), Cloud-Native Network Functions ("CNFs"), etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 105. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 105, from DN 750, and may forward the user plane data toward UE 105 (e.g., via RAN 710, SMF/PGW-C 720, and/or one or more other devices). In some embodiments, multiple instances of UPF/PGW-U 735 may be deployed (e.g., in different geographical locations), and the delivery of content to UE 105 may be coordinated via the N9 interface (e.g., as denoted in FIG. 7 by the line marked "N9" originating and terminating at UPF/PGW-U 735). Similarly, UPF/PGW-U 735 may receive traffic from UE 105 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 105.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 105 may communicate, through DN 750, with data servers, other UEs 105, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 105 may communicate.

Figure 8:
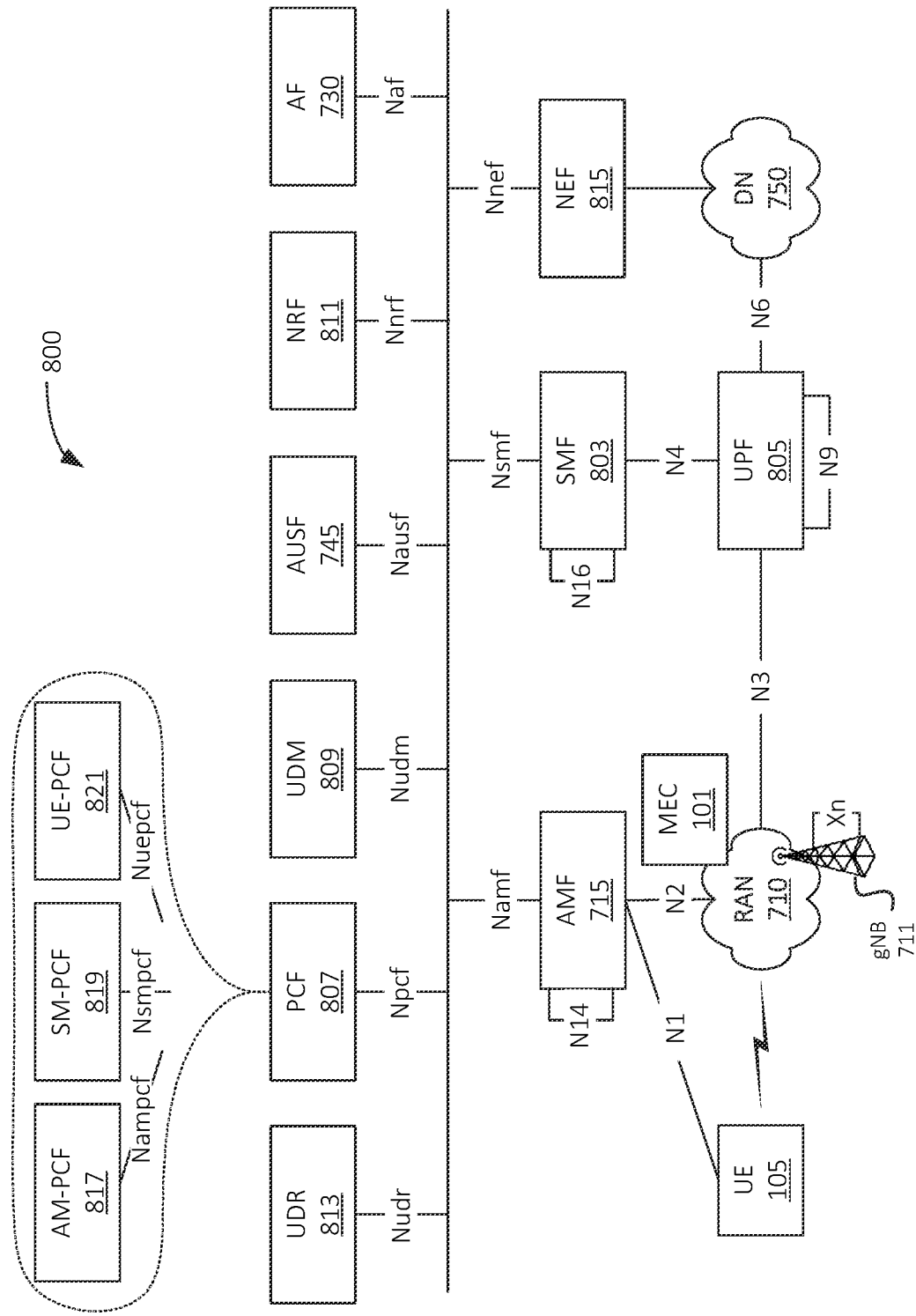

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 105, RAN 710 (which may include one or more gNBs 711 or other types of wireless network infrastructure) and various network functions, which may be implemented as VNFs, CNFs, etc. Such network functions may include AMF 715, SMF 803, UPF 805, PCF 807, UDM 809, AUSF 745, Network Repository Function ("NRF") 811, AF 730, Unified Data Repository ("UDR") 813, and Network Exposure Function ("NEF") 815. Environment 800 may also include or may be communicatively coupled to one or more networks, such as Data Network DN 750.

The example shown in FIG. 8 illustrates one instance of each network component or function (e.g., one instance of SMF 803, UPF 805, PCF 807, UDM 809, AUSF 745, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 805, etc., while another slice may include a second instance of SMF 803, PCF 807, UPF 805, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 809), an Npcf interface, an Nupf interface, an Nnef interface, an Nsmf interface, an Nnrf interface, an Nudr interface, an Naf interface, and/or one or more other SBIs.

UPF 805 may include one or more devices, systems, VNFs, CNFs, etc., that receive, route, process, and/or forward traffic (e.g., user plane traffic). As discussed above, UPF 805 may communicate with UE 105 via one or more communication sessions, such as PDU sessions. Such PDU sessions may be associated with a particular network slice or other suitable QoS parameters, as noted above. UPF 805 may receive downlink user plane traffic (e.g., voice call traffic, data traffic, etc. destined for UE 105) from DN 750, and may forward the downlink user plane traffic toward UE 105 (e.g., via RAN 710). In some embodiments, multiple UPFs 805 may be deployed (e.g., in different geographical locations), and the delivery of content to UE 105 may be coordinated via the N9 interface. Similarly, UPF 805 may receive uplink traffic from UE 105 (e.g., via RAN 710), and may forward the traffic toward DN 750. In some embodiments, UPF 805 may implement, may be implemented by, may be communicatively coupled to, and/or may otherwise be associated with UPF/PGW-U 735. In some embodiments, UPF 805 may communicate (e.g., via the N4 interface) with SMF 803, regarding user plane data processed by UPF 805 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 105 that communicate via the 5GC and/or RAN 710. PCF 807 may receive information regarding policies and/or subscriptions from one or more sources, such as subscriber databases (e.g., UDM 809, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs. The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 809 and/or one or more other sources.

NEF 815 include one or more devices, systems, VNFs, CNFs, etc. that provide access to information, APIs, and/or other operations or mechanisms of the 5GC to devices or systems that are external to the 5GC. NEF 815 may maintain authorization and/or authentication information associated with such external devices or systems, such that NEF 815 is able to provide information, that is authorized to be provided, to the external devices or systems. Such information may be received from other network functions of the 5GC (e.g., as authorized by an administrator or other suitable entity associated with the 5GC), such as SMF 803, UPF 805, a charging function ("CHF") of the 5GC, and/or other suitable network function. NEF 815 may communicate with external devices or systems via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF; NEF 815 may include, may implement, may be implemented by, and/or may otherwise be associated with a Service Capability Exposure Function ("SCEF"); and so on.

Figure 9:
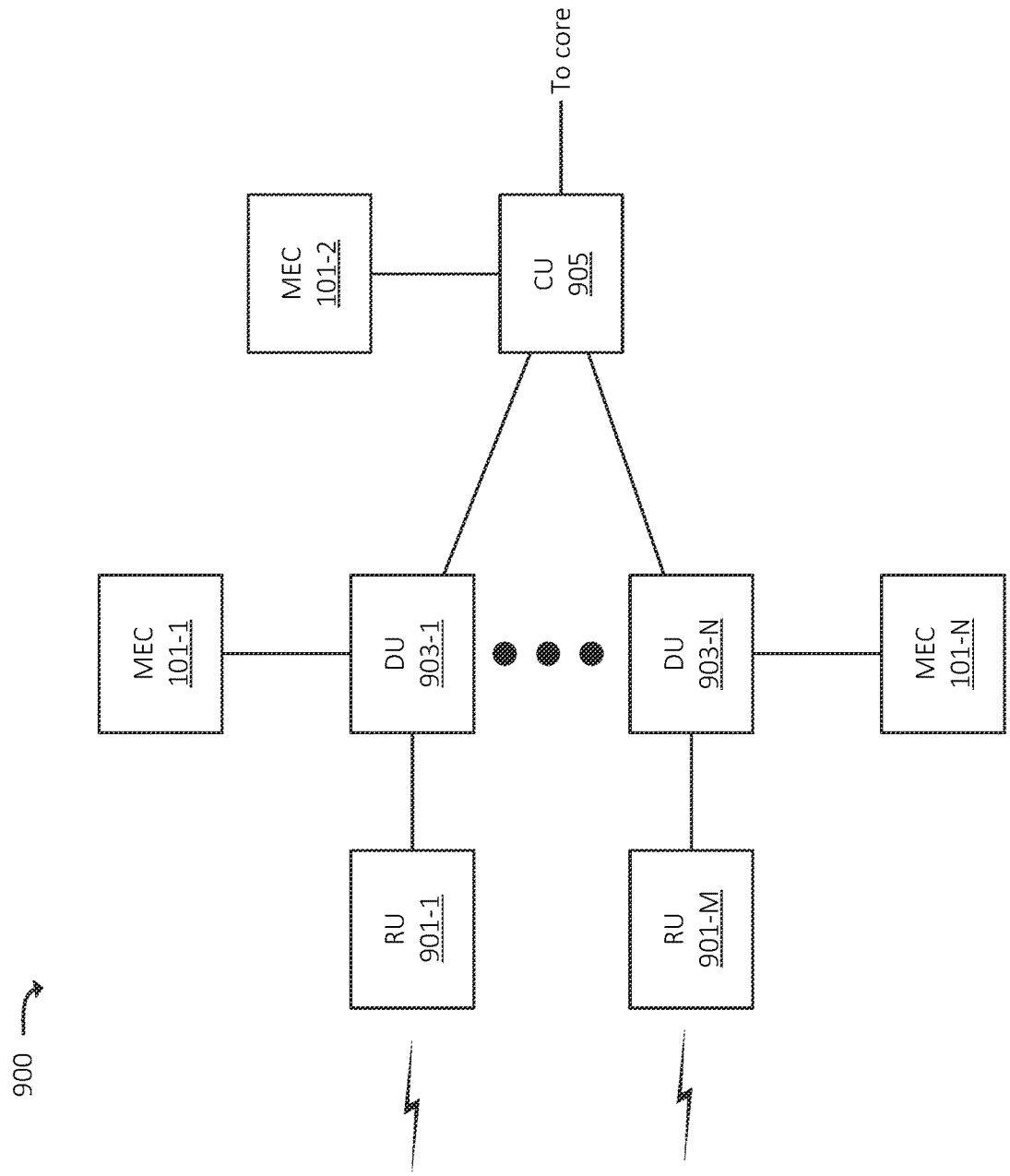
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 715 and/or UPF 805). In the uplink direction (e.g., for traffic from UEs 105 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 105, and may determine which DU(s) 903 should receive the downlink traffic. DU 903 may include one or more devices that transmit traffic between a core network (e.g., via CU 905) and UE 105 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 105.

RU 901 may include hardware circuitry (e.g., one or more RF transceivers, antennas, radios, and/or other suitable hardware) to communicate wirelessly (e.g., via an RF interface) with one or more UEs 105, one or more other DUs 903 (e.g., via RUs 901 associated with DUs 903), and/or any other suitable type of device. In the uplink direction, RU 901 may receive traffic from UE 105 and/or another DU 903 via the RF interface and may provide the traffic to DU 903. In the downlink direction, RU 901 may receive traffic from DU 903, and may provide the traffic to UE 105 and/or another DU 903.

One or more elements of RAN environment 900 may, in some embodiments, be communicatively coupled to one or more edge computing devices, such as MECs 101. For example, DU 903-1 may be communicatively coupled to MEC 101-1, DU 903-N may be communicatively coupled to MEC 101-N, CU 905 may be communicatively coupled to MEC 101-2, and so on. MECs 101 may include hardware resources (e.g., configurable or provisionable hardware resources) that may be configured to provide services and/or otherwise process traffic to and/or from UE 105, via a respective RU 901.

For example, DU 903-1 may route some traffic, from UE 105, to MEC 101-1 instead of to a core network via CU 905. MEC 101-1 may process the traffic, perform one or more computations based on the received traffic, and may provide traffic to UE 105 via RU 901-1. In some embodiments, MEC 101 may include, and/or may implement, some or all of the functionality described above with respect to UPF 805, AF 730, and/or one or more other devices, systems, VNFs, CNFs, etc. In this manner, ultra-low latency services may be provided to UE 105, as traffic does not need to traverse DU 903, CU 905, links between DU 903 and CU 905, and an intervening backhaul network between RAN environment 900 and the core network.

Figure 10:
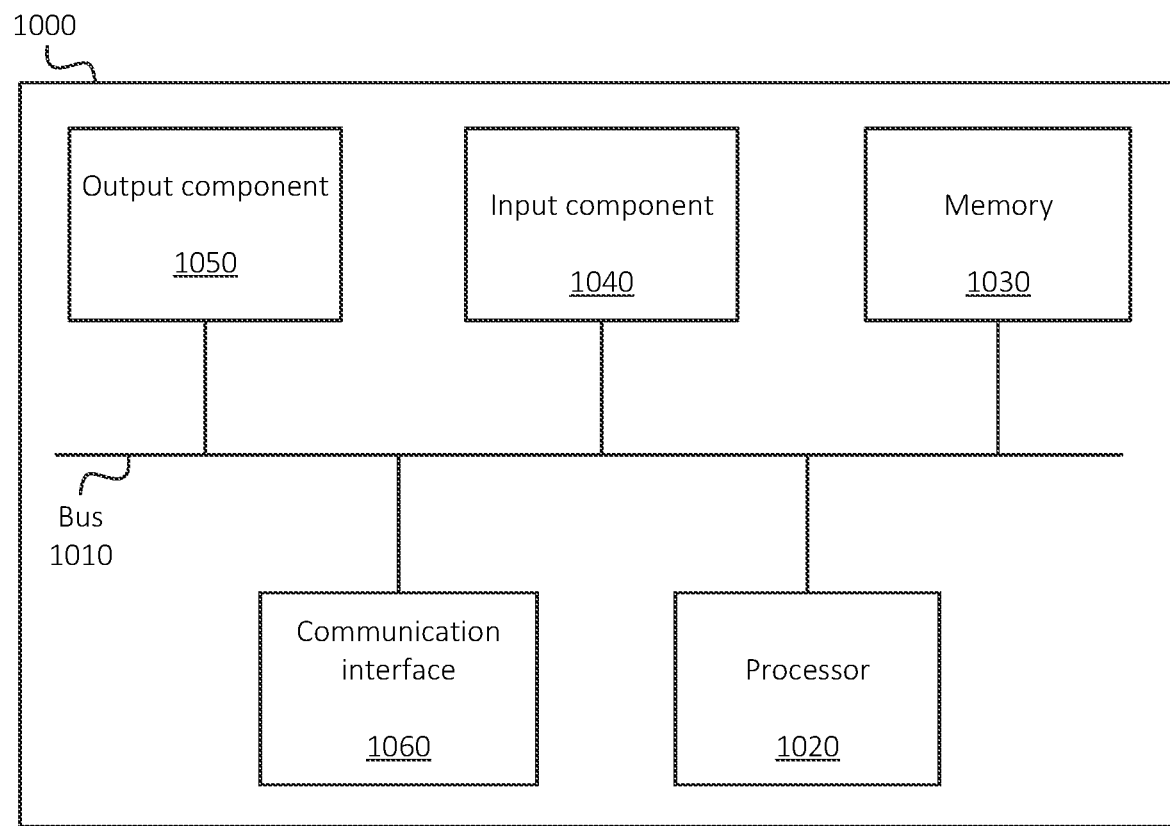
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C, 2, 3A, 3B, and 4-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
determine that a first measure of likelihood of demand for a particular service from a first set of edge computing devices exceeds a first threshold;
instruct the first set of edge computing devices to provision resources to provide the particular service, based on determining that the first measure of likelihood of demand for the particular service from the first set of edge computing devices exceeds the first threshold;
determine that a second measure of likelihood of demand for the particular service from a second set of edge computing devices exceeds a second threshold, the second set of edge computing devices being a subset of the first set of edge computing devices;
initiate a service state synchronization operation with respect to the second set of edge computing devices based on determining that the second measure of likelihood of demand for the particular service from the second set of edge computing devices exceeds the second threshold; and
select a particular edge computing device, of the second set of edge computing devices, to provide the particular service to a particular User Equipment ("UE"), wherein the particular edge computing device provides the service to the particular UE in accordance with a service state that is based on the service state synchronization operation.

2. The device of claim 1, wherein the particular edge computing device is a first edge computing device, wherein the particular UE receives the particular service from a second edge computing device prior to the selection of the first edge computing device.

3. The device of claim 1, wherein the service state synchronization operation includes the UE outputting service state information to each edge computing device of the second set of edge computing devices.

4. The device of claim 1, wherein instructing the first set of edge computing devices to provision resources to provide the particular service is performed prior to determining that the second measure of likelihood of demand for the particular service from the second set of edge computing devices exceeds the second threshold.

5. The device of claim 4, wherein the service state synchronization operation is not performed with respect to the second set of edge computing devices until the determination that the second measure of likelihood of demand for the particular service from the second set of edge computing devices exceeds the second threshold.

6. The device of claim 1, wherein based on receiving the instruction to provision resources to provide the particular service, the first set of edge computing devices perform at least one of:
allocate a set of hardware resources to provide the service, or
instantiate one or more containers or applications to provide the service.

7. The device of claim 1, wherein the one or more processors are further configured to:
after selecting the particular edge computing device to provide the particular service to the particular UE, cease the service state synchronization operation with respect to one or more other edge computing devices of the second set of edge computing devices.

8. A non-transitory computer-readable medium, storing a plurality of processor-executable instructions to:
determine that a first measure of likelihood of demand for a particular service from a first set of edge computing devices exceeds a first threshold;
instruct the first set of edge computing devices to provision resources to provide the particular service, based on determining that the first measure of likelihood of demand for the particular service from the first set of edge computing devices exceeds the first threshold;
determine that a second measure of likelihood of demand for the particular service from a second set of edge computing devices exceeds a second threshold, the second set of edge computing devices being a subset of the first set of edge computing devices;
initiate a service state synchronization operation with respect to the second set of edge computing devices based on determining that the second measure of likelihood of demand for the particular service from the second set of edge computing devices exceeds the second threshold; and
select a particular edge computing device, of the second set of edge computing devices, to provide the particular service to a particular User Equipment ("UE"), wherein the particular edge computing device provides the service to the particular UE in accordance with a service state that is based on the service state synchronization operation.

9. The non-transitory computer-readable medium of claim 8, wherein the particular edge computing device is a first edge computing device, wherein the particular UE receives the particular service from a second edge computing device prior to the selection of the first edge computing device.

10. The non-transitory computer-readable medium of claim 8, wherein the service state synchronization operation includes the UE outputting service state information to each edge computing device of the second set of edge computing devices.

11. The non-transitory computer-readable medium of claim 8, wherein instructing the first set of edge computing devices to provision resources to provide the particular service is performed prior to determining that the second measure of likelihood of demand for the particular service from the second set of edge computing devices exceeds the second threshold.

12. The non-transitory computer-readable medium of claim 11, wherein the service state synchronization operation is not performed with respect to the second set of edge computing devices until the determination that the second measure of likelihood of demand for the particular service from the second set of edge computing devices exceeds the second threshold.

13. The non-transitory computer-readable medium of claim 8, wherein based on receiving the instruction to provision resources to provide the particular service, the first set of edge computing devices perform at least one of:
allocate a set of hardware resources to provide the service, or
instantiate one or more containers or applications to provide the service.

14. The non-transitory computer-readable medium of claim 8, wherein the plurality of processor-executable instructions further include processor-executable instructions to:
after selecting the particular edge computing device to provide the particular service to the particular UE, cease the service state synchronization operation with respect to one or more other edge computing devices of the second set of edge computing devices.

15. A method, comprising:
determining that a first measure of likelihood of demand for a particular service from a first set of edge computing devices exceeds a first threshold;
instructing the first set of edge computing devices to provision resources to provide the particular service, based on determining that the first measure of likelihood of demand for the particular service from the first set of edge computing devices exceeds the first threshold;
determining that a second measure of likelihood of demand for the particular service from a second set of edge computing devices exceeds a second threshold, the second set of edge computing devices being a subset of the first set of edge computing devices;
initiating a service state synchronization operation with respect to the second set of edge computing devices based on determining that the second measure of likelihood of demand for the particular service from the second set of edge computing devices exceeds the second threshold; and
selecting a particular edge computing device, of the second set of edge computing devices, to provide the particular service to a particular User Equipment ("UE"), wherein the particular edge computing device provides the service to the particular UE in accordance with a service state that is based on the service state synchronization operation.

16. The method of claim 15, wherein the particular edge computing device is a first edge computing device, wherein the particular UE receives the particular service from a second edge computing device prior to the selection of the first edge computing device, wherein the service state synchronization operation includes the second edge computing device outputting service state information to at least one of:
the first edge computing device, or
another device that forwards the service state information to the first edge computing device.

17. The method of claim 15, wherein instructing the first set of edge computing devices to provision resources to provide the particular service is performed prior to determining that the second measure of likelihood of demand for the particular service from the second set of edge computing devices exceeds the second threshold.

18. The method of claim 17, wherein the service state synchronization operation is not performed with respect to the second set of edge computing devices until the determination that the second measure of likelihood of demand for the particular service from the second set of edge computing devices exceeds the second threshold.

19. The method of claim 15, wherein based on receiving the instruction to provision resources to provide the particular service, the first set of edge computing devices perform at least one of:
   allocate a set of hardware resources to provide the service, or
   instantiate one or more containers or applications to provide the service.

20. The method of claim 15, further comprising:
   after selecting the particular edge computing device to provide the particular service to the particular UE, cease the service state synchronization operation with respect to one or more other edge computing devices of the second set of edge computing devices.

* * * * *